Patented Dec. 20, 1927.

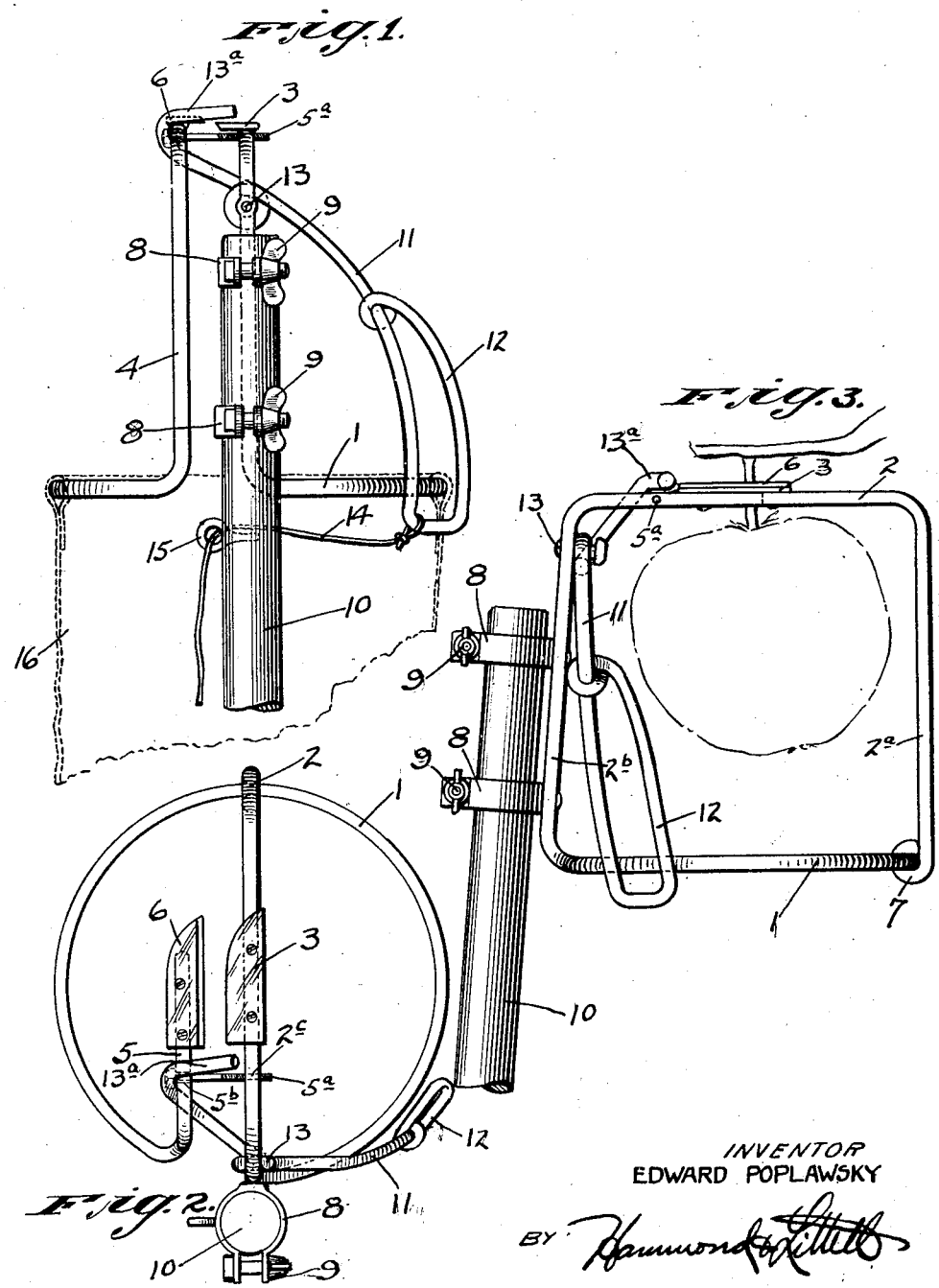

1,653,412

UNITED STATES PATENT OFFICE.

EDWARD POPLAWSKY, OF NEWARK, NEW JERSEY.

FRUIT PICKER.

Application filed December 29, 1925. Serial No. 78,109.

This invention relates to an improvement in apparatus for picking fruit or the like.

It is an object of the invention to provide a fruit picker which may be operated by hand to pick fruit near the ground and which may be suspended upon a pole for picking fruits from the tops of trees, and which will operate with equal facility in either position.

Another object of the invention is to provide a fruit picker which is of simple construction and which may be constructed out of substantially one piece of material so as to reduce the cost and increase the facility for operation thereof.

Another object of the invention is to provide a fruit picker in which the natural resiliency of the material is used to effect the opening of the blades of the cutter, so that no springs or other delicate devices, likely to get out of adjustment, are used.

Another object of the invention is to provide a fruit picker which can be guided with accuracy between the clusters of fruit so as to pick a ripened fruit from among a cluster without disturbing or destroying the surrounding unripened fruit.

Various other objects and advantages will appear as the description of the invention proceeds.

Referring now to the drawings, which illustrate a preferred form of embodiment of my invention,—

Figure 1 is a rear elevation of the fruit picker,

Figure 2 is a plan view thereof,

Figure 3 is a side view illustrating how the apparatus is used for picking an apple or the like.

In its preferred embodiment, my fruit picker comprises a substantially complete ring 1, provided with a guiding finger or bridge wall 2, which extends from front to back thereof above the ring 1, and supports the stationary cutter knife 3. One end of the material forming the ring 1 is bent upward at 4 and the end thereof is extended in a horizontal direction at 5 to provide a support for the movable cutter blade 6, the knife blade 3 being attached to the bridge wall 2 which in turn is immediately attached to the supporting pole 10, is relatively fixed. The knife blade 6, however, is attached to the remote end of the ring at 5 and due to the flexibility of the material of which the ring is made, is relatively movable to the knife blade 3. All of this portion of the fruit picker is preferably formed of one piece of resilient material, which may be of heavy wire or metal rod construction.

In the formation of the device, the horizontal portion 5 is bent at right angles to the portion 4, and the ring portion is then bent from the lower end of the portion 4. The finger 2, extending up from one portion of the ring, is bent forward across the top of the ring, and down at 2ª, and is made to encircle the forward portion of the ring 1 at 7, to provide rigidity for both the ring 1 and the forward portion 2ª, of the guide finger. The rear portion 2ᵇ of the guide finger may be provided with clamping members 8, adjustable by means of the wing nuts 9 so as to enclose and grip a suitable pole 10 by which the fruit picker can be extended to pick fruit at various distances above the ground. The material of the portions 4 and 5 is bent upward so as to space the cutter blades 3 and 6 as indicated in Figs. 1 and 2, and the natural resiliency of the ring 1 is utilized to separate the knives and maintain them so separated. For operating the movable knife to sever the fruit, an operating arm 11 having a hand portion 12 is loosely pivoted at 13 on the rearward arm 2ᵇ of the guide finger 2 and when this arm is drawn toward the pole 10 the end 13ª thereof, which is bent around the portion 5 supporting the movable blade 6, draws the movable blade toward the stationary blade 3 to sever the stem of any fruit which may be between the knives. It will be noted that the location of the pivot for the arm 11 is such that the end portion 13ª not only serves to draw the knives toward each other in a horizontal plane, but also to draw the movable knife downward in a vertical plane toward the stationary knife 3 so as to insure efficient cutting of these blades or knives. In particular, as will be noted from the drawing, Fig. 3, the upper part of the arm 11 is bent at an angle to the lower part with the vertex at the pivot, and the arm is loosely pivoted to the support at 13. By a movement of the handle 12 toward the pole 10, it is necessary that the lower end of the operating arm move in the plane of Fig. 3 and also in the perpendicular plane of Fig. 2. The resulting movement on the upper end 13ª of the operating arm will create a cutting engagement between the two blades. If desired, a bolt 5ª may be used to limit the movement of the movable knife and keep the same in proper alignment with the stationary knife. The bolt 5ᵃ passes freely through a hole 5ᵇ in the portion 5 and is threaded into a hole 2ᶜ in the finger 2. When the knife 6 is moved back and forth in the act of cutting the portion 5 slides over the bolt 5ᵃ and the knife is thereby guided into engagement with the stationary knife 3. The head of the bolt 5ᵃ limits the distance the knives will separate and such distance may be adjusted by turning the bolt in either direction to screw it further into or out of the finger 2. For operating the fruit picker when suspended at the end of a long pole 10, a cord or wire 14 may be secured to the lower end of the operating handle 11 and passed through an eyelet 15 near the top of the pole so that by pulling on the lower end of the cord or wire 14, the movable knife is caused to operate in the same manner as when the handle 11 is moved by hand. The resiliency of the ring 1 causes the knives to separate as soon as the arm 11 is released.

To prevent injury to the fruit from dropping upon the ground, an annular bag or chute 16 of suitable fabric is attached to the ring 1 and the opposite end of the bag is extended into a basket or receptacle (not shown) for receiving the fruit, so that when the fruit is severed by the knives 3 and 6, it drops through the bag 16 into the proper receptacle without substantial injury to the fruit.

In the use of the device for picking at either low or high altitudes, the picker is guided between the branches and between clusters of fruits, by means of the guide finger 2; it being possible to insert this finger between the ripened and unripened fruit in the same cluster and thereby, as in the case of cherries, for example, cut out the ripened cherry from the unripened cherries without disturbing or injuring the growth of the unripened cherries.

The device is of light weight and easily manipulated so as to have substantially the facility of selection which may be had by actual hand picking. At the same time it is rapid in operation and may be used without injury to the fruit so as to permit more rapid picking than possible by hand, especially where the picker has to use ladders to climb to pick fruit from the tops of trees.

It will be readily appreciated that a device of the type described may be manufactured and sold at a small cost and at the same time provide a rugged construction with no complicated parts which are likely to wear out or get out of adjustment. The blades 3 and 6 are removably secured upon the arms 2 and 5 so as to permit substitution or removal of these blades for sharpening, as desired.

While I have illustrated a preferred form of embodiment of my invention, it will be understood that various modifications and changes can be made therein without departing from the spirit of the invention or the scope of the appended claims.

I claim:

1. In a fruit picker, the combination of a broken ring adapted to receive fruit, means to support said ring, a relatively stationary guide arm integral with one end of said broken ring attached to said supporting means and provided with a knife, an operating arm integral with the other end of said ring, movable relative to the guide arm, and provided with a second knife and means to move the operating arm toward the guide arm and to cause the knives to sever stems of fruit held therebetween.

2. In a fruit picker, a broken ring adapted to support a bag, means to support a portion of said ring comprising an extension handle, an integral and relatively stationary guide arm extending across said ring above the same, attached to said support, a knife supported on said arm, an integral operating arm extending upward from said ring, and movable relative to said guide arm, a second knife supported on said operating arm, and means to move the second knife toward the first mentioned knife to sever stems of fruit held therebetween.

3. In a fruit picker, a supporting means, an integral resilient broken ring having an integral and relatively stationary guide arm attached to said support, an integral and relatively movable cutter arm projecting above the same, a knife supported on said guide arm, a second knife supported on said cutter arm, and a lever pivoted on said guide arm and adapted to move said second knife horizontally and vertically toward said first mentioned knife.

4. In a fruit picker, a chute supporting means comprising a single piece of wire-shaped material bent to form a substantially circular body portion, one end being bent at right angles to the plane of the body portion, the second end also being bent similarly to the first end, a supporting pole, an operating arm pivotally supported by the first bent end and to which the supporting pole is attached, and knife blades relatively movable and integrally attached beyond the first mentioned bends such that the plane of the blades is parallel to that of the substantially circular body portion.

In testimony whereof I have affixed my signature to this specification.

EDWARD POPLAWSKY.